United States Patent [19]
Henegar

[11] 3,755,787
[45] Aug. 28, 1973

[54] SYSTEM FOR PROVIDING INTERRUPTS IN A NUMERICAL CONTROL SYSTEM

[75] Inventor: Hubert B. Henegar, Detroit, Mich.

[73] Assignee: The Bendix Corporation, Southfield, Mich.

[22] Filed: Apr. 26, 1972

[21] Appl. No.: 249,446

[52] U.S. Cl. ............................................. 340/172.5
[51] Int. Cl. ............................................. G06f 9/18
[58] Field of Search ................................. 340/172.5

[56] References Cited
UNITED STATES PATENTS
| | | | |
|---|---|---|---|
| 3,553,656 | 1/1971 | Bernhardt | 340/172.5 |
| 3,370,276 | 2/1968 | Schell, Jr. | 340/172.5 |
| 3,538,504 | 11/1970 | Higginbotham | 340/172.5 |

Primary Examiner—Gareth D. Shaw
Attorney—Lester L. Hallacher et al.

[57] ABSTRACT

A system for reliably applying interrupts to a numerical control system is described. The computer which processes the control data of the Numerical Control System periodically checks to see if an interrupt from an external device is present. The inventive system constrains the interrupts to the least significant pulse positions of the device addresses. The presence of interrupt pulses at the more significant pulse positions results in the automatic disabling of an interrupt system. The reliability of the system is therefore greatly enhanced because illegal or erroneous interrupts do not disturb the normal functioning of the system.

6 Claims, 1 Drawing Figure

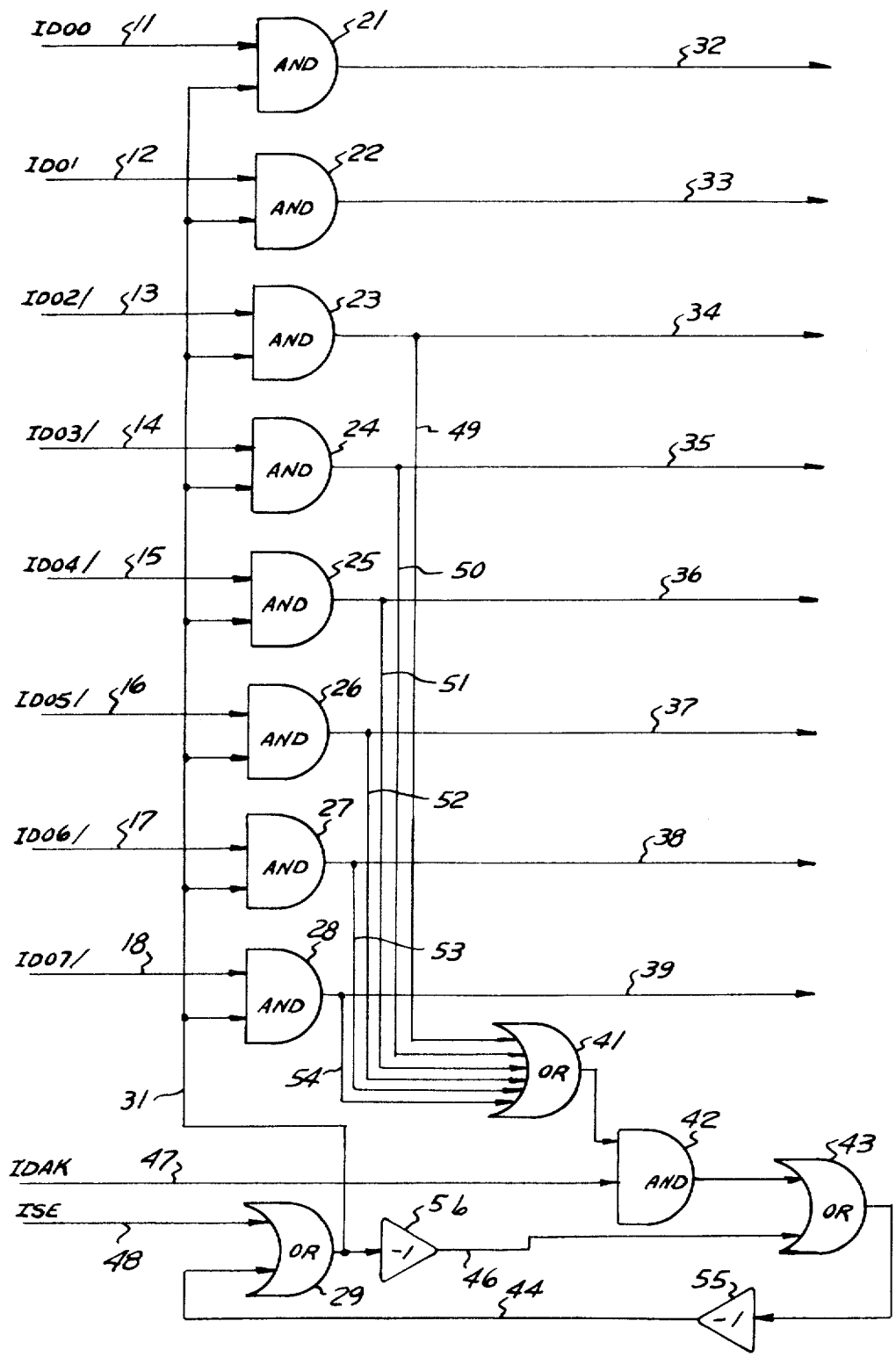

SYSTEM FOR PROVIDING INTERRUPTS IN A NUMERICAL CONTROL SYSTEM

CROSS REFERENCES TO RELATED APPLICATIONS

The invention described herein is an improvement of the system described in application Ser. No. 62,244 filed Aug. 6, 1970 by H. B. Henegar and Robert J. Patterson and said application is useful in understanding the environment in which the instant invention is employed.

The invention described herein can be employed in a system including the invention described in application Ser. No. 249,447 entitled "Numerical Control System Control Program Loader" filed of even date herewith by H. B. Henegar and assigned to the assignee of the instant application. The invention described herein can be employed in a system also included in the invention described in application Ser. No. 249,448 entitled "Output Command Decoder for Numerical Control Equipment" filed of even date herewith by H. B. Henegar and assigned to the assignee of the instant application.

The invention described herein can also be employed with the invention described in application Ser. No. 249,445 entitled "Control System for Plural Tape Readers in an N/C System" filed of even date herewith by H. B. Henegar and assigned to the assignee of the instant application.

BACKGROUND OF THE INVENTION

Many numerical control systems employ a computer to process the data which effects the control of servo motors, pulse motors or the deflection coils of a CRT so that an element such as a cutting tool, graphic pen, or electron beam can be controlled in two or three dimensional space in accordance with the data processed by the computer. Because a computer processes all the data which controls the external devices employed in the numerically controlled machine, it frequently becomes necessary to inform the computer that there is a signal available from an external device so that some operation can be performed on this external device. The signal which informs the computer that an external device is to be energized is ordinarily called an interrupt and hence, the term interrupt is defined in the numerical control art as a signal which is used to interrupt the ordinary functioning of the computer so that the function or operation required of the interrupting device can be performed. Only a single interrupt signal line exists and any device that wishes to interrupt places a signal on this line. After the completion of the performance of the interrupting device, the computer returns to its ordinary routine at the place where it left off before the interrupt was received.

In existing numerical control equipment, either one of the two possible techniques are ordinarily employed to detect the source of an interrupt signal into the computer. In the first system, the external device generates the interrupt signal which interrupts the ordinary functioning of the computer as soon as the computer completes the operation defined by the current instruction. Upon command by the computer (a specific pulse is output), the interrupting device supplies its interrupt address to the computer.

In another technique the computer sequentially scans or scrutinizes the external devices to determine whether or not, if any, which external device or devices has generated an interrupt signal. If such a signal is detected, the computer proceeds to perform the interrupting operation on the external device and returns to the programmed routine at the end of the interrupting operation. These techniques are well known to those skilled in the art and are employed in various manners in most all numerical control equipment.

SUMMARY

The inventive system is primarily intended for usage in the first type of system wherein the interrupting external device supplies an address to the computers when commanded to do so by the computer. Thus, in the inventive system if an external device provides an interrupt signal, the computer detects the source of the interrupt signal and then performs the desired operation on the external device. Each interrupting device has a particular address by which the computer can identify the external device. As is known, an address is composed of a series of logic ONE's and ZERO's and each particular arrangement of ONE's and ZERO's forms a different address. Accordingly, in a computer capable of inputting an eight bit address from the interrupting external device, 256 distinct addresses are available.

However, all 256 addresses are rarely used for 256 external devices and hence the interrupt address often is confined to the least significant pulse positions of the external device address, and the more significant pulse positions are always ZERO. Accordingly, if an interrupt address is being input to the computer, the logic ONE's will appear only on the address digits having the lesser significance while the digits of more significance will be logic ZERO. If a logic ONE occurs on one of the more significant digits, the inventive interrupt system automatically forces all digits to logic ZERO causing the device address of ZERO to be input to the computer. The computer then shuts down since it has been programmed to recognize a ZERO address as an error condition. The number of pulse positions which must be allowed to go to logic ONE is dependent upon the number of interrupts which are to be employed. Thus, if three interrupts are to be employed in the system, either or both of the least significant two digits can be logic ONE. Alternatively, seven interrupts can be accommodated by permitting any combination of the three least significant digits to be logic ONE's and fifteen interrupts can be accommodated utilizing the four least significant digits, etc. If, say, only six interrupting devices exist in the system and they have interrupt addresses 1–6, the inventive circuitry would not prevent the insertion of device address 7 but would block addresses greater than 7. In order to sense the error condition that exists when an address of 7 is entered into the computer, software means must be provided. The means of doing this is well known, and would be employed to insure the reliability of the system.

The inventive system is therefore advantageous because the presence of a logic ONE on any of the more significant digit results in an orderly and controlled shutdown of the system so that erroneous interrupts do not cause malfunctioning of the entire numerical control system. In the absence of this scheme, a considerable amount of computer program and program storage is typically required to sense the presence of nonsensical device addresses and to provide the orderly shutdown.

BRIEF DESCRIPTION OF THE DRAWINGS

The FIGURE shows a preferred embodiment of the inventive system.

DETAILED DESCRIPTION OF THE DRAWINGS

The FIGURE shows a plurality of interrupt device (ID) signals, identified as ID00 through ID07, being applied to the inventive interrupt system over Input Leads 11 through 18 respectively. Because eight ID signals are available, as many as 256 different combinations of ZERO's and ONE's can be applied to Input Leads 11 through 18. Accordingly, as many as 256 external devices can have individual addresses represented by the ID signals. However, depending upon the number of external devices which must be capable of providing interrupt signals to the computer, only a limited number of Input Signals (ID) need be allowed to become logic ONE when inputting the interrupting devices addresses to the computer. For example, as shown in the FIGURE, only the ID00 and ID01 signals can be used to identify three interrupt addresses. If either or both of ID00 or ID01 become logic ONE, a logic ONE is available on either output Line 32 or 33 and is therefore input to the computer. Thus, the ID00 and ID01 signals are permitted to become logic ONE to indicate the address of a legitimate interrupt. However, as explained hereinafter if any one of the ID03 to ID07 signals become logic ONE, the system automatically shuts down.

It should be understood that by using only the ID00 and ID01 signals to generate interrupts, three external devices can interrupt the computer. If ID02 also is permitted to generate an interrupt as many as seven interrupt signals can be generated and as many as seven external devices will be capable of interrupting the computer.

AND Gates 21 through 28 are two input AND gates and each of the AND gates receives an ID input and an input from OR Gate 29 by way of Lead 31. The Output Leads 34 to 39 of AND Gates 23 to 28 are connected to OR Gate 41 by way of Lines 49 to 54, respectively. The output of OR Gate 41 is applied to one input terminal of a dual input AND Gate 42. The output of AND Gate 42 is coupled to one input terminal of an OR Gate 43. The output of OR Gate 43 is coupled by way of an Inverter 55 and Lead 44 to one input terminal of OR Gate 29 and the output of OR Gate 29 is connected to the other input terminal of OR Gate 43 by way of an Inverter 56 and Line 46. OR Gate 29 also enables AND Gates 21 to 28 over Lead 31. AND Gate 42 also receives an Input-Output Acknowledge (IOAK) signal by way of Lead 47. IOAK is a signal output by the computer when an interrupt occurs which commands the interrupting device to send its address to the computer. OR Gate 29 also receives an interrupt System Enable (ISE) signal on Input Terminal 48.

In operation, when a logic ONE signal is available on either or both of Output Leads 32 and 33 of AND Gates 21 and 22 and not on Leads 34-39 while IOAK is a logic ONE, a permissible device address is being input. This address is received and the computer proceeds to carry out the function dictated by the interrupting device. Because of the availability of two logic ONE signals on Output Leads 32 and 33, three different addresses, 1-3, can be utilized. The fourth possible address, 0, can not be assigned to a device as will become clear later. If it is desired to permit more than three devices to provide the interrupt, Output Lead 34 will also be allowed to go to logic ONE without disabling the system This will be accomplished by eliminating Line 49 which couples output Terminal 34 to the input of OR Gate 41. In similar manner, if it is desired to permit between 7 to 15 external devices to interrupt the computer, Lead 50 which couples Output Terminal 35 of AND Gate 24 to OR Gate 41 will be eliminated. It should also be appreciated that if desired, the address can contain more, or less, than eight digits so that the number of ID signals applied to the system can be increased or decreased accordingly.

Because the presence of logic ONE's on Output Leads 32 and 33 are intended to be the only permissible device addresses, the presence of logic ONE's on Output Leads 34 through 39 of AND Gates 23 through 28 while the IOAK signal is present must be effective in shutting down the entire interrupt system. This is accomplished by the preferred embodiment of the inventive system shown in the FIGURE in the following manner:

Firstly, the system is enabled by the application of a logic ONE Interrupt System Enable Pulse (ISE) to Input Terminal 48 of OR Gate 29. Once applied, the logic ONE output from OR Gate 29 is passed sequentially through Inverter 56, OR Gate 43, Inverter 55 and then back to the second input terminal of OR Gate 29. The ISE signal may then return to logic ZERO while all other signals in the above chain of logic will remain unchanged. With a logic ONE signal present at the output of OR Gate 29 on Lead 31. AND Gates 21 through 28 all are enabled such that their outputs will equal their corresponding ID inputs. These outputs connect directly to the computer and are the means by which the address is input to the computer.

Because of the logic table of an AND Gate, the application of the input-Output Acknowledge signal (IOAK) to Input Terminal 47 conditions AND Gate 42, to yield a logic ONE only when the output of OR Gate 41 is a logic ONE. If the output of OR Gate 41 goes to logic ONE, AND Gate 42 simultaneously receives two high, or logic ONE, inputs and as known to those skilled in the art, the AND Gate then generates a logic ONE output. The output of AND Gate 42 is directed to OR Gate 43. The output of OR Gate 43 becomes logic ONE and the second input to OR Gate 29 becomes logic ZERO because of the Inverter 55. The continued operation of the system requires a logic ONE output from OR Gate 29 because the ISE signal applied to OR Gate 29 over Input Terminal 48 was removed after the system was actuated. Accordingly, anytime the AND Gate 42 output goes to ONE, the output of OR Gate 29 goes to ZERO removing the enabling signal from Line 31 so that AND Gates 21 through 28 are immediately disabled. Hence, any ONE's which had appeared on Leads 32 through 39 are removed and an effective device address of ZERO is input to the computer. The computer is programmed to treat an interrupt from an apparent device ZERO as an error condition and will cause an orderly and safe shutdown of the numerical control system when such a condition occurs.

Hence, in the initial operation of the system, the application of the Interrupt System Enable pulse (ISE)

enables each of AND Gates 21 through 28. Logic ONE's appearing on the ID inputs to these gates are passed through to the computer as long as the ID02 through ID07 inputs remain at a low state while the IOAK signal is a logic ONE. Accordingly, both inputs to AND Gate 42 are not at logic ONE simultaneously. Because AND Gate 42 receives a logic ZERO input from OR Gate 41 and a logic ONE input from the IOAK signal or vice-versa, its output remains a logic ZERO and therefore OR Gate 43 yields a ZERO output which is changed to logic ONE by Inverter 55. OR Gate 29 then enables AND Gates 21 through 28. However, if any of the ID02 through ID07 signals goes high to logic ONE while IOAK is a ONE, the output terminal of the AND gate which receives the high ID signal goes high and causes OR Gate 41 to yield a logic ONE output. This logic ONE is applied to AND Gate 42 causing AND Gate 42 to generate a logic ONE output. When a logic ONE output is applied to OR Gate 43, a logic ZERO is applied to OR Gate 29 so that its output goes low, thereby disabling AND Gates 21 through 28.

After the system is disabled in the manner described hereinabove, the ISE interrupt enable signal must be applied to OR Gate 29 over Input Lead 48 and after this signal is applied for a very short period of time, it can be removed because the system is self-sustaining by the operation of feedback loop including Inverters 55 and 56 and OR Gates 43 and 29.

I claim:

1. in a system for controlling a plurality of external devices with a data storage device wherein each of said external devices has a unique address represented by a string of logic pulses having sequentially lesser address significance and each pulse being either of two logic levels, an interrupt system for enabling said external devices to individually apply interrupting address signals to said data storage device, said interrupting address signals being present when a selected number of said address pulses in the lower significance positions are at a selected one of said two logic states, said interrupt system including:

first means for receiving said interrupting address signals and an enable signal and producing at least one interrupt signal and at least one response signal;

second means for receiving all of said at least one response signals and generating said enable signal when all of said at least one response signals are at one logic level and a disable signal when any of said at least one response signals is at another logic level so that said first means produces no output signals when said disable signal is generated by said second means.

2. the system of claim 1 wherein said first means for receiving includes a plurality of logic means individually responsive to said interrupting device address signals and said enable signal, a portion of said logic means producing said interrupt when said device interrupting address signals and said enable signals are of the same logic state, and the remainder of said logic means producing said response signals when said enable signal and all of said device address interrupting signals are different.

3. the system of claim 2 wherein said second means for receiving includes gate means for receiving said response signals and producing said enable signal when all of said response signals are at a logic state different from the logic state of said interrupt address signals and said disable signal when any one of said response signals has a logic state the same as the state of said interrupt address signals.

4. In a numerical control system for controlling external devices with data from a computer, a system for transmitting device address interrupt signals from an external device to said computer, wherein a plurality of address pulses indicative of the address of an external device is available to said computer in parallel form and said device address interrupt signals are represented by one logic state of said address pulses, said system for transmitting device address interrupt signals comprising:

a plurality of logic means equal in number to said plurality of address pulses for individually and simultaneously receiving said pulses;

system enable logic means for receiving a system start signal and producing an enable signal, each of said plurality of logic means receiving said enable signal and producing a signal of one logic state when said address pulse and said enable signal are the same as said one logic state, and a signal of another logic state for all other combinations of logic states of said address pulses and said enable signal;

enable signal retention means responsive to a first portion of said plurality of logic means for actuating said system enable logic means when said first portion of said plurality of logic means all yield an output different from said one logic state and for disabling said first portion of logic means for other combination of said address pulses and said outputs, the remainder of said plurality of logic means also receiving said enable signal to produce said interrupt signals when said enable signal and said address pulses are the same logic state, said remainder of said logic means receiving the address pulses of the lesser significance.

5. The system of claim 4 wherein said address pulses are applied to said remainder of said logic means at a first logic state, and said enable signal is at said first logic state so that said interrupt pulses are produced at said first logic state, and said address pulses are applied to said first portion of said logic means at a second logic state;

and wherein said enable signal retention means includes gate means for producing said enable signal at said first logic state when all of said address pulses applied to said first portion of said logic means are at said second logic state, and said enable signal retention means disables said system for transmitting interrupt signals when any one of said address pulses to said first portion of said logic means becomes said first state.

6. The system of claim 4 wherein said enable signal retention means includes first gate means responsive to said first portion of said plurality of logic means and producing an output of said one logic state when said address pulses and said enable signal are said one logic state, and producing an output of said other logic state;

and logic means for receiving and inverting the output of said first gate means to thereby provide said enable signal when said address pulses and said enable signal are different.

* * * * *